United States Patent
Yuen et al.

(10) Patent No.: US 8,413,055 B2
(45) Date of Patent: Apr. 2, 2013

(54) METHODS AND SYSTEMS FOR CUSTOMIZING AND EMBEDDING WIDGETS IN INSTANT MESSAGES

(75) Inventors: Paul Man-Wing Yuen, Hong Kong (CN); Calvin Man-Lap Yuen, Hong Kong (CN)

(73) Assignee: Vaka Corporation, Grand Cayman (KY)

( * ) Notice: Subject to any disclaimer, the term of this patent is extended or adjusted under 35 U.S.C. 154(b) by 0 days.

(21) Appl. No.: 13/155,691

(22) Filed: Jun. 8, 2011

(65) Prior Publication Data

US 2011/0289428 A1   Nov. 24, 2011

Related U.S. Application Data

(63) Continuation of application No. 12/936,866, filed as application No. PCT/IB2009/005784 on Apr. 21, 2009, now abandoned.

(60) Provisional application No. 61/125,060, filed on Apr. 21, 2008.

(51) Int. Cl.
*G06F 3/01* (2006.01)

(52) U.S. Cl. ........ 715/733; 715/752; 715/758; 715/208; 719/315

(58) Field of Classification Search ............... 715/752, 715/758, 208; 719/315
See application file for complete search history.

(56) References Cited

U.S. PATENT DOCUMENTS

| | | |
|---|---|---|
| 2005/0156873 A1 | 7/2005 | Walter et al. |
| 2006/0005207 A1 | 1/2006 | Louch et al. |
| 2006/0015818 A1 | 1/2006 | Chaudhri et al. |
| 2006/0277481 A1 | 12/2006 | Forstall et al. |
| 2007/0266093 A1 | 11/2007 | Forstall et al. |
| 2011/0210933 A1* | 9/2011 | Forstall .................. 345/173 |

FOREIGN PATENT DOCUMENTS

| | | |
|---|---|---|
| CN | 1520089 A | 8/2004 |
| CN | 101005487 A | 7/2007 |
| CN | 101026596 A | 8/2007 |

* cited by examiner

*Primary Examiner* — Andrea Leggett
(74) *Attorney, Agent, or Firm* — Merchant & Gould

(57) ABSTRACT

An enhanced instant messaging environment is provided where end user can choose from a list of customizable widgets, personalize and embed the widgets within messages in minimal steps. By allowing the embedment of widgets in messages, the environment empowers users with new means for online communication with new level of widget intelligence that takes into account multi-dimensional criteria, including but not limited to the screen-estate of its presentation and role of viewer for information presentation and operation options.

9 Claims, 6 Drawing Sheets

METHODS AND SYSTEMS FOR CUSTOMIZING AND EMBEDDING WIDGETS IN INSTANT MESSAGES

This application is a Continuation application of U.S. Ser. No. 12/936,866, filed 7 Oct. 2010, which is a National Stage Application of PCT/IB2009/005784, filed 21 Apr. 2009, which claims benefit of Ser. No. 61/125,060, filed 21 Apr. 2008 in the United States and which applications are incorporated herein by reference. To the extent appropriate, a claim of priority is made to each of the above disclosed applications.

BACKGROUND OF THE INVENTION

I. Field of the Invention

The present invention generally relates to data processing and Graphical User Interfaces (GUI) of Computer Systems; including those for common personal computers, laptop computers, personal data assistants, advanced wireless communications devices having embedded computational applications, "thin" client front end systems (relying on server based CPU engines), distributed computing systems, and the like. The invention also relates to instant messaging, rich messaging, widgets, personalization and customization.

II. Background Information

Instant messaging is a popular communication tool that enables two or more users to exchange messages via a network during an instant messaging session. When two users are online at the same time, for instance, instant messages may be exchanged in real time between the two users. Thus, the instant messages may be utilized to support a text conversation between the two users in a manner that mimics how the two users would participate in a typical spoken conversation. To enhance the richness of the messaging environment, technologies have been developed to allow users to express their emotions as emoticons during text conversations. Published Application No. US20050156873A1 describes a system for allowing the creation of custom emoticons, and describes the transmission mechanism within instant messaging applications. Published Application No. U.S. Pat. No. 7,091,976 discloses technology that describes the support of animation entities in more general messaging environment settings.

As an invention created independent of messaging, widgets are invented to provide easy access to frequently used functions and information. Typical widgets include news aggregators, clocks, calculators, calendars, desktop notes and weather forecasts. These widgets usually appear on a user's computer desktop to provide easy access to the specific applications. In recent years, as the popularity of social networks has increased, a new class of widgets has developed. These widgets allow individuals to share with their friends and other Internet users interesting web clips, pictures, or other things that relate to the individual. For example, these widgets may process raw contents to provide certain visual effects and they are usually embedded within web pages to be shared with the page viewers. Typically, different authoring environments are required for creating and customizing the various widgets of interests. Published Application No. US20060277481A1 describes technology relating to clipping customized web content. Meanwhile, there are also tools that help developers create widgets using basic raw materials (e.g. HTML, CSS, etc). Published Application No. US20060005207A1 describes technology relating to providing a unified authoring environment for developers to create widgets of consistent visual appearances based on such raw materials. Published Application No. US20060015818A1 discloses technology that describes a dashboard framework for managing and interacting with widgets. In addition, Published Application No. US20070266093A1 describes technology where widgets are responsible for managing workflows. Such so-called workflow widgets may further be embedded in a communication system where the widgets maybe distributed or updated by multiple users. Such usage of widgets further establishes the role of widgets in processes that involve multiple users.

There is a need for a system and method that brings together instant message and widgets whereby the widgets are customized and embedded within the instant messages. In such a system where widgets are embedded within instant messages, there is a need for a framework where widgets can be treated like emoticons. However, these widgets need to be different from conventional emoticons, which are merely graphical animation sequences. Widgets need to be capable of offering useful functions and information to the message recipient. While traditional widgets such as those described in Published Application No. US20070266093A1 are created to manage formal workflows, there is a need for widgets that are operatively configured to help users express themselves in casual conversations. There is a need for a system and method whereby users may easily select, embed and easily customize widgets according to the conversation context of the instant message.

SUMMARY OF THE INVENTION

Consistent with embodiments of the present invention, systems and methods are disclosed for enhancing the instant messaging environment wherein a user may select at least one widget from a list of customizable widgets, personalize the widgets selected and embed the widgets within messages in minimal steps. By allowing the embedment of widgets in messages, the invention empowers users with a new means for online communication configured to utilize a new level of widget intelligence that takes into account the screen real estate available and the role of the viewer in determining how the widget and associated information is presented and operated within the environment provided. In accordance with yet another embodiment, a computer-readable medium is provided that facilitates the enhancement of the instant messaging environment wherein a user may can select a widget from a list of customizable widgets, personalize the widget selected and embed the widget within a message in minimal steps.

In one embodiment, the present invention can be implemented as an enhanced instant messaging system with the ability to customize and embed widgets within messages.

In another embodiment, the present invention can be integrated with existing instant messaging systems to enhance their pure-graphic emoticons with user-customized and/or real-time info widgets as mini-applications embedded in instant messages, similar to the ways how emoticons are used and represented graphically as icons and spatially in terms of layout with the text, in instant messaging services.

It is to be understood that both the foregoing summary of the invention and the following detailed description are exemplary and explanatory only, and should not be considered restrictive of the scope of the invention, as described and claimed. Further, features and/or variations may be provided in addition to those set forth herein

BRIEF DESCRIPTION OF THE DRAWINGS

The accompanying drawings, which are incorporated in and constitute a part of this disclosure, illustrate various embodiments and aspects of the present invention. In the drawings.

GENERAL DESCRIPTION

Figure 1:
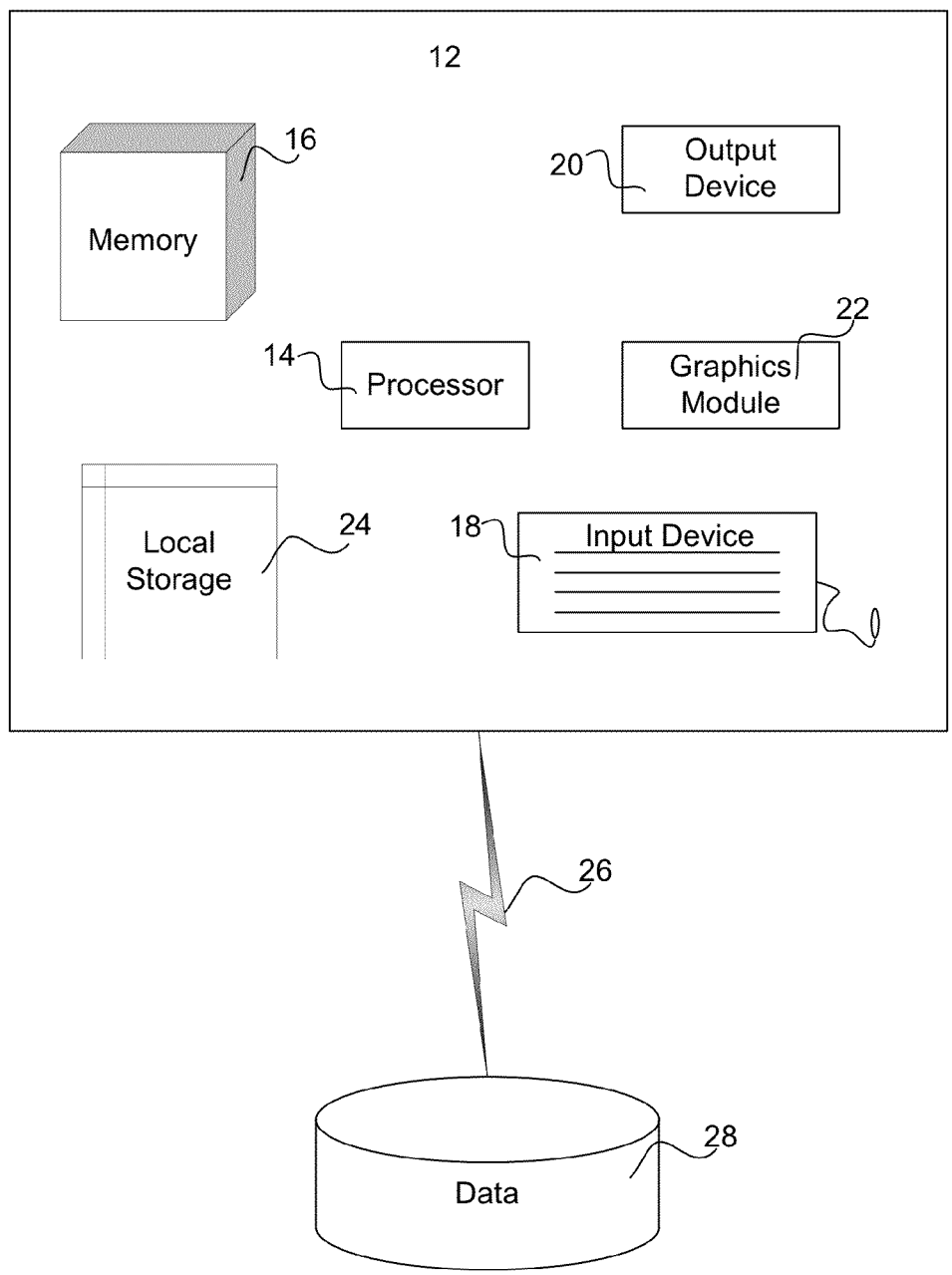
FIG. 1 a block diagram depicting the architecture and components of the instant messaging widget framework.

Consistent with embodiments of the present invention, systems and methods are disclosed that facilitates widget customization and embedment within instant messages. An object of the invention is a system and method that provides an intelligent widget that has multiple states with multiple views of scalable levels of information details and operation options. Another object is to provide a workflow where embedding widgets in instant messages is simplified. Another object of the invention is to provide a system and method that facilitates the personalization and customization of widgets so that they fit optimally within a message context. Another object of the invention is to help users manage and organize the myriad of different widget instances sent to or received from different users. Another object of the invention is to define a uniform widget customization framework so that users may benefit from the same consistent customization workflow when customizing any widgets. Another object of the invention is to provide a reusable component that any messaging system can reuse to support widget embedment. Other objects of the invention are to provide a module that facilitates the addition of new widgets to the framework, to provide an application that will facilitate the adaption of third party widgets into the customization framework and to provide an application configured for saving received widgets to be used for future embedment.

Another object of the invention is to provide a ubiquitous widget customization and embedment mechanism for messaging across computer systems including those for common personal computers, laptop computers, personal data assistants, advanced wireless communications devices having embedded computational applications, "thin" client front end systems (relying on server bases CPU engines), distributed computing systems, and the likes. An object of the invention is a system and method for providing an intelligent widget container module operatively configured to optimize the organization, display, layout and navigation of widgets within the amount of space available on a display for an application to provide output according to the environment as well as meta data associated with a widget, including but not limited to data representative of widget type and classification.

The systems and methods of the present invention introduce a framework where widgets are capable of offering useful functions and information to the message recipient. The systems and methods of the present invention enable users to be able to easily customize widgets for the purpose of a conversation; enable users to be able to easily select and embed widgets in messages and easily customize the widget according to the conversation context. Unlike message file attachments which may allow users to view or interact with the file within a message and typically have a single viewing state, the present invention not only allows presentation of widget information and operation options in-situ within the message, it also allows multiple widget states which may have multiple views of scalable levels of detail and interaction across various contexts of an instant message that take into account the available screen real estate for the widget as well as the role of the viewer, i.e. sender vs. recipient. For example, when a widget is in the context of an overall message view, represented as an icon, a smaller set of information will be displayed and interaction options may be allowed. When a widget is in its full view, more information and more interaction options are presented to the user. In addition to screen real estate as a governing factor on the "scalability" of the levels of detail and interaction, the role of the viewer will also affect the presentation of information and operation options.

Instant messaging applications that have been enhanced with the ability to customize and embed widgets within messages shall be referred to as widget-aware instant messaging applications. While composing a message within a widget-aware instant messaging application, a sender can trigger a widget container module to select a widget of interest. A widget container module is a module that allows users to manage the display, layout and navigation of widgets. Because widgets are dynamic mini-applications, substantially more sophisticated than mere graphics animations, the sender of an instant message that includes a widget will need to customize the widget selected. The present invention utilizes a customization manager module to help users with the customization process.

After a sender has completed the customization step, a customization manager module will pass the customized widget to the widget message adapter module. The widget message adapter module is responsible for converting the widgets into an appropriate data format to be inserted into an instant message. The instant message will then be transmitted from the sender's application, through an instant messaging network via typical peer-to-peer or client-server transmission protocol, to the recipient's instant message application. At the receiving end, the widget-aware instant messaging application will invoke the message adapter module to process the embedded widget data. The message adapter module normalizes the data and passes it to the widget player module which is responsible for rendering widget content.

The widget-aware messaging application will receive a unique widget player instance of each compilation of embedded data passed to the widget player module. The widget-aware messaging application can then render and display the widgets within the context of the instant message. Recipients of the instant messages can interact with the widget player module to playback the customized widget sent. Each widget player utilized in the present invention supports multiple rendering views so that the widget-aware messaging application can display an icon mode within the context of the instant message, and then trigger a full interaction window mode when the user clicks on the icon.

The present invention includes four primary modules, a widget container, a widget customization manager, a widget message adapter and a widget player. The widget container manages the collection of widgets that can be selected in the instant messaging context. The container manages the organization of the widgets and how they appear to the user. As a sample embodiment, a widget container may require a conformant widget to provide icons so that the widgets can be rendered within the container. Moreover, the container may sort and display the widgets according to the frequency of use.

The container manages normalized widgets whose metadata, contents and states are stored in persistent repositories. As a sample embodiment, the container may store the metadata and states of each widget in a repository represented by a relational database; the metadata, contents, and states may be serialized into a XML fragment or a BLOB to be stored in a single row of a database table. The table may also have columns storing the usage statistics of the widgets. In addition, it is also conceived in the invention that the container can interact with multiple persistent repositories which may be associated with different access control levels, physical locations, and interaction protocols. For example, the containers may interact with remote public repositories via distributed protocol such as SOAP to retrieve the list of widgets available and their data, and interact with local private repositories through local file system and database connections. The containers can be configured to cache results from remote repositories into the local ones, the repositories can be configured to allow, disallow, add and remove operations by making use of typical access control mechanisms, and the repositories may also be configured to delete and purge widgets automatically according to rules that may relate to the creator, user, age and usage statistics of the widgets.

Moreover, the widget container module may collaborate with the widget player instance to save the widget currently being rendered in the instance. The widget player instance passes on the widget of interest to the widget container, and the widget container will then serialize the widget data and store it within the repository of interest. Finally, the user can interact with the import manager module to import third party widgets into the widget container so that the widgets can adapt to the standards of the widget container and the customization manager. A more detailed description of the import manager module is provided below.

The widget customization manager module is responsible for defining a common customization method and providing a consistent customization user interface for a user to customize the widgets. As a sample embodiment, the widget customization manager may require all widgets to be implemented as HTML content and to be customizable through replacing certain text regions in the HTML code with different values. In addition, the widget will provide the metadata that allows the widget customization manager to retrieve the name, description, and the valid values of each customizable parameter associated with the widget. In a typical workflow, the widget container module passes a widget of interests to the widget customization manager module. The widget customization manager module takes control of the user interaction by presenting a widget customization window. The widget customization manager module processes the widget's metadata to determine what parameters can be customized, creates the appropriate user interface components dynamically according to the nature of the parameters, and populates the window so that the user can interact to define the customizable parameters. Finally, after the user has finished the customization step, the widget customization manager stores the customized parameter within the widget and passes the widget to the widget message adapter module.

The widget message adapter module is used to allow easy extension of any instant message systems so that is supports widgets. The widget message adapter module is responsible for converting widgets into data that can be inserted into an instant message and converting the embedded data back to a widget data format that a widget player can process and display. Different implementations of the widget message adapter can be defined so that the invention can operate on top of different instant messaging networks. As a sample embodiment of the interaction of the widget message adapter module with text-based instant message networks, the widget message adapter module is responsible for converting widgets to and from text strings. In the sending work flow, the widget message adapter module first processes the customized widget to be sent by saving the widget to a repository that can be retrieved by the recipient. It then creates a widget text string containing the necessary retrieval URL information and inserts the text string into the instant message. In addition, the widget text string contains a unique tag that wraps around the URL so that a widget-aware instant messaging application knows that this particular substring represents a widget. To create the retrieval URL, the widget adapter module passes the widget to the widget container to store the customized widget to a public remote repository. The URL can then be constructed based on the URL of the public remote repository and the identifier of the widget saved within the repository.

When displaying a message with embedded widgets, the widget-aware instant messaging application detects the widget tags and extracts the widget substrings within the instant message. The application then passes the substrings to the widget adapter module for processing. The widget adapter module parsers the substring, extracts the URL, and requests the widget container to retrieve the actual widget from the appropriate repository. The message adapter then passes the widget to the widget player module which will return a widget player instance to the widget-aware instant messaging application for rendering.

The widget player module is responsible rendering the widget and managing the user interaction of the widget. The player module will create a separate widget player instance for each widget that needs to be rendered. The player instance may support multiple modes of rendering. There may be a minimized mode where a graphical icon representing the widget is displayed within the message similar to how an emoticon is displayed in a message. Moreover, there may be an expanded mode where the user can fully view and interact with the widget. The user may click on the icon in minimized mode to trigger the widget-aware instant messaging application to display the expanded view of the player instance. While an icon is a sample embodiment of the player instance's minimized mode view, a browser control is a sample embodiment of the player instance's expanded mode view. Browser controls are components that are designed to display any general web page content, and provided by the vendors of operating systems or ISV, and are readily available as SDKs on desktop and mobile operating systems. Since many widgets are implemented using HTML code, browser controls can be used to display a wide variety of widgets currently available on the Internet. Based on the context of the instant message, the screen real estate of the widget representation and the role of the viewer/user, the widget player filters the data contained in the widget to provide scalable level of information details and operation options.

It is also contemplated that in an embodiment of the invention, widgets may dynamically select and package content to be rendered by the widget player from a set of available information that the widget is capable of rendering, based on the viewing context of the widget, including but not limited to the role of the viewer, the current screen real estate allocated to the widget, as well as other multi-dimensional criteria, including but not limited to the importance, relevancy and age of the information to be rendered.

The widget import manager allows users to import widgets into the system by adapting the widgets to requirements imposed by the widget container and the widget customization manager. As a sample embodiment of a widget import manager, an import manager may be implemented to support the import of any HTML-based widgets. The manager may allow users to specify the location within the HTML text where the customization can be performed and the valid customization parameter values. Moreover, different implementations of the import manager can be configured to process widgets of different formats and transform them into the normalized format required by the widget container and customization module.

The messaging module represents a typical messaging infrastructure currently available in the marketplace such as Windows Messenger, Skype, Jabber, etc. It may be implemented using a peer-to-peer mechanism or a client-server mechanism or a mixture of the two.

As an alternative embodiment of the invention, the widget framework can be packaged as a reusable library without the messaging application and network. Using the library, developers can add the widget customization and embedment mechanism to any instant messaging systems. Different ports of the library can be implemented to support widget messaging across different computer systems; including those for common personal computers, laptop computers, personal data assistants, advanced wireless communications devices having embedded computational applications, "thin" client front end systems (relying on server bases CPU engines), distributed computing systems, and the like.

DETAILED DESCRIPTION

The following detailed description refers to the accompanying drawings. Wherever possible, the same reference numbers are used in the drawings and the following description to refer to the same or similar parts. While several embodiments and features of the invention are described herein, modifications, adaptations and other implementations are possible, without departing from the spirit and scope of the invention. Rather these embodiments are provided so that this disclosure will be complete and will fully convey the invention to those skilled in the art. For example, substitutions, additions or modifications may be made to the components illustrated in the drawings, and the methods described herein may be modified by substituting, reordering or adding steps to the disclosed methods. Accordingly, the following detailed description does not limit the invention. Instead, the proper scope of the invention is defined by the appended claims.

In one embodiment, the present invention may run two personal computing systems both of which are connected through networks upon which current instant messaging operate. The computing systems of the communicating users may be a personal computer, workstation, handheld computer, mobile device, consumer electronics device, or the like. One example of a computing system 10 upon which the present invention may function is a personal computer 12 running the Windows XP operating system, such as the system illustrated in FIG. 1. As shown the system 10 includes a computer 12, processor 14, memory 16, input devices 18 such as keyboard and mouse, and output device 20 such as a display monitor. A graphics module 22, such as a graphics card, may be provided for generating output for output device 20. A user interacts with system 10 by providing input via input devices 18 and viewing output via output device 20.

Computer 12 also includes local storage 106, such as a hard drive, and can also include network connection 26 for accessing remote server 28. These components are well-known hardware components commonly used for running software applications. In one embodiment, software embodying the invention is provided on a computer-readable medium such as local storage 24.

Figure 2:
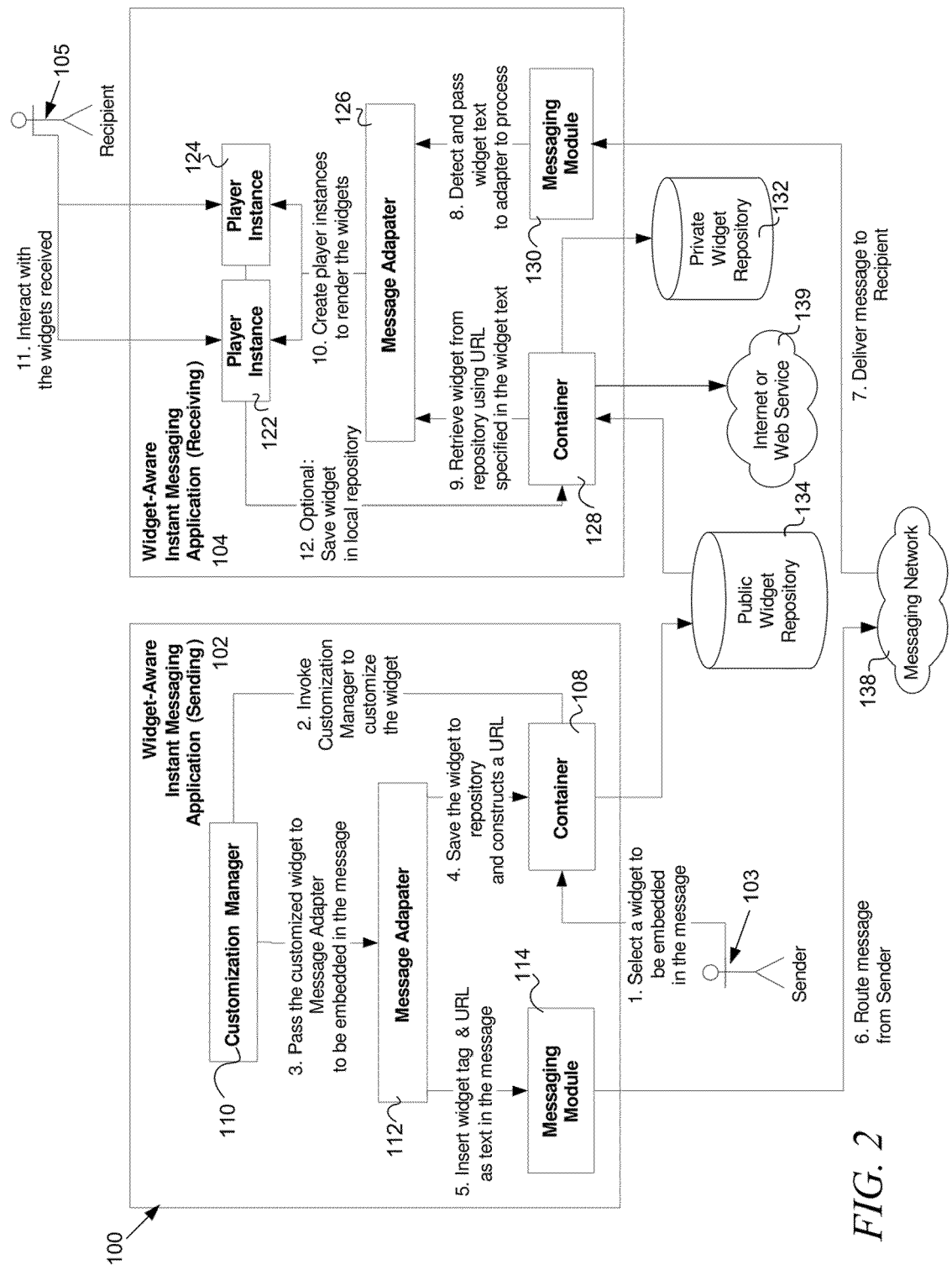
FIG. 2 illustrates the activity flow behind a typical interaction flow supported by the instant messaging widget framework.

Referring now to FIG. 2, an embodiment of a system 100 upon which the present invention may be operated is illustrated. The system 100 includes a first widget aware instant messaging application 102 operating on a computing system that is being controlled by a first user 103 and a second widget aware instant messaging system 104 operating on a computing system that is being controlled by a second user 105. While first user 103 is composing a message within first widget aware instant messaging application 102, the first user 103 triggers the widget container module 108 to present a selection of available widgets. First user 103 selects a widget of interest. Because widgets are dynamic mini applications, the sender will need to customize the widget selected. The customization manager 110 is initiated to customize the widget selected. After the first user 103 completes the customization through using the customization manager 110, the customization manager module 110 will pass the customized widget to the widget message adapter module 112, which converts the widget into an appropriate data format for insertion into the instant message. Multiple widgets may be embedded within the same. The first user 103 inserted another widget by repeating the aforementioned process. Next, the two customized widgets are sent by saving the widget to a repository that can be retrieved by the recipient. The widget message adapter module 112 then creates a widget text string containing the necessary retrieval URL information for each widget and inserts the text string into the instant message. In addition, the widget text string contains a unique tag that wraps around the URL so that a widget-aware instant messaging application knows that this particular substring represents a widget. To create the retrieval URL, the widget message adapter module 112 passes the widgets to the widget container 108 to store the customized widgets to a public remote repository 134. The URLs can then be constructed based on the URL of the public remote repository 134 and the identifiers of the widgets saved within the repository 134. The widget text string containing the necessary retrieval URL information that has been inserted into the text string and inserted into the instant message for each widget is transmitted over the messaging network 138 by the messaging module 114. Messaging network 138 delivers the message sent by first user 103 to the second widget aware instant messaging system 104 operating on a computing system that is being controlled by a second user 105. The receiving messaging module 130 of the second widget aware instant messaging system 104 receives the instant message and detects that the message includes two widget text strings associated with two different widgets and passes the instant message to the receiving message adapter module 126 for which is operatively configured to the embedded widget data. The receiving widget adapter module 104 parses the substrings, extracts the URLs, and requests the receiving widget container 128 to retrieve the actual widgets from the public widget repository 134. The retrieved widgets may contain previously stored data together with the widget in the public widget repository 134, and/or real-time information that the widget container 128 retrieves from the Internet or web service via the Internet 139. The receiving message adapter 126 then passes the widgets to the widget player module which will return two widget player instances 122, 124 for the two widgets to the second widget-aware instant messaging application 104 for rendering. The second user 105 of the second widget aware instant messaging system 104 may also save the widgets sent along with the instant message into a private widget repository 132.

Figure 3:
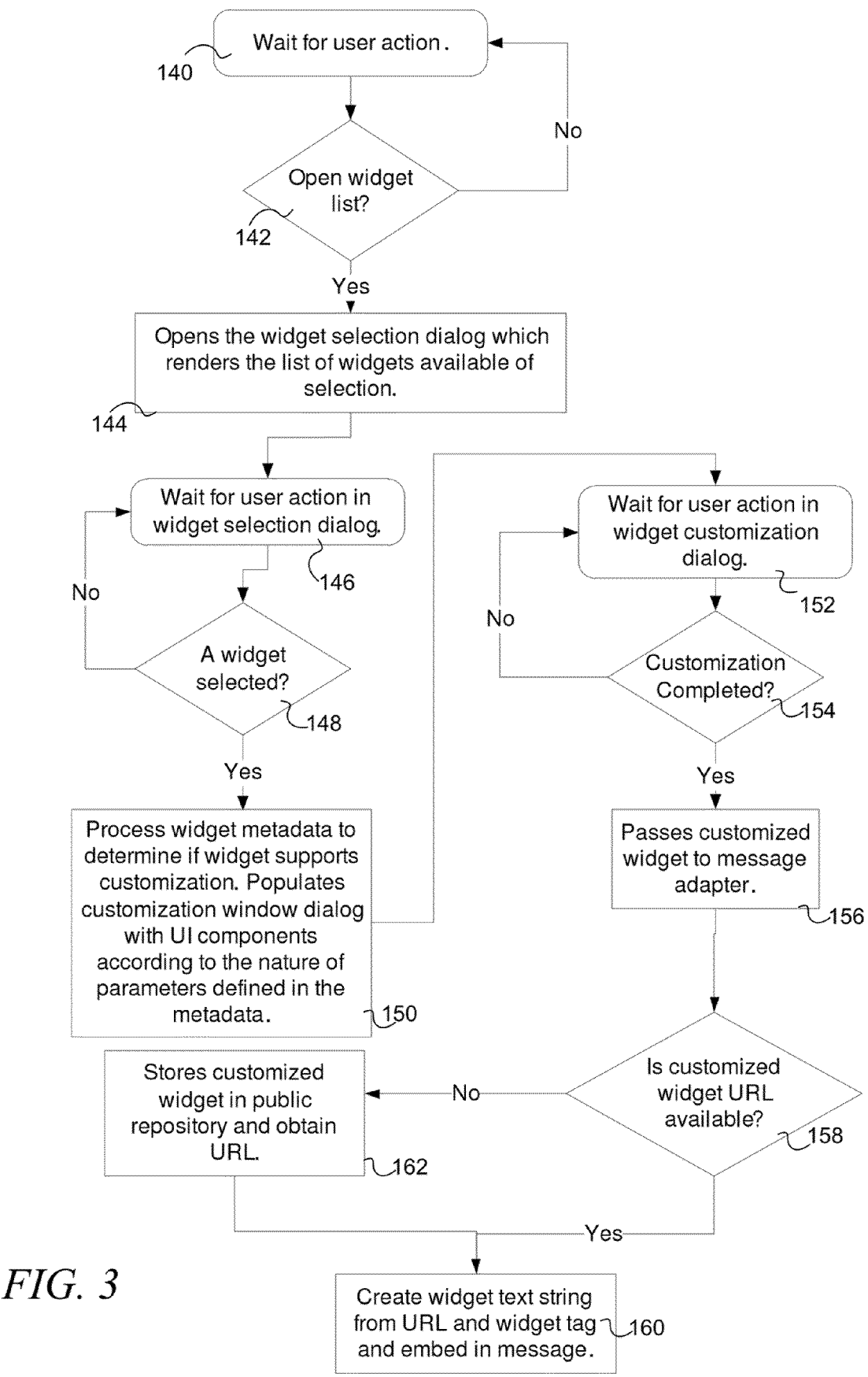
FIG. 3 illustrates the process flow of a message with embedded widget(s) within the instant messaging widget framework.

Referring now to FIG. 3, which illustrates the process flow of a sender computing system, transmitting an instant message in which a widget has been embedded. A widget aware instant messaging application integrated into a computing environment waits for user action 140. The sender of a proposed message that may include a widget is presented with an opportunity to open a list of widgets 142. If the user desires to open a list of widgets, the user opens a widget selection dialogue which renders the list of widgets available for selection 142. Next the widget aware instant messaging application waits for the user to initiate some action in the widget selection dialogue 146. Upon the user selecting a widget 148, widget meta data is processed to determine if the widget supports customization 150. A customization window is populated in a dialogue with the user interface components and is initiated according to the nature of parameters defined in the meta data 152. The application then waits for user action in a widget customization dialogue 152. Upon customization of the widget 154, the customized widget is transmitted to a sender message adapter 156. The application automatically determines if a customized widget URL is available 158. If a customized URL is not available, the widget aware instant messaging application stores the customized widget in a public repository and obtains the URL 162. If the customized widget URL is available, the widget aware instant messaging application creates a widget text string from the URL and a widget tag and embeds it into the message 160.

Figure 4:
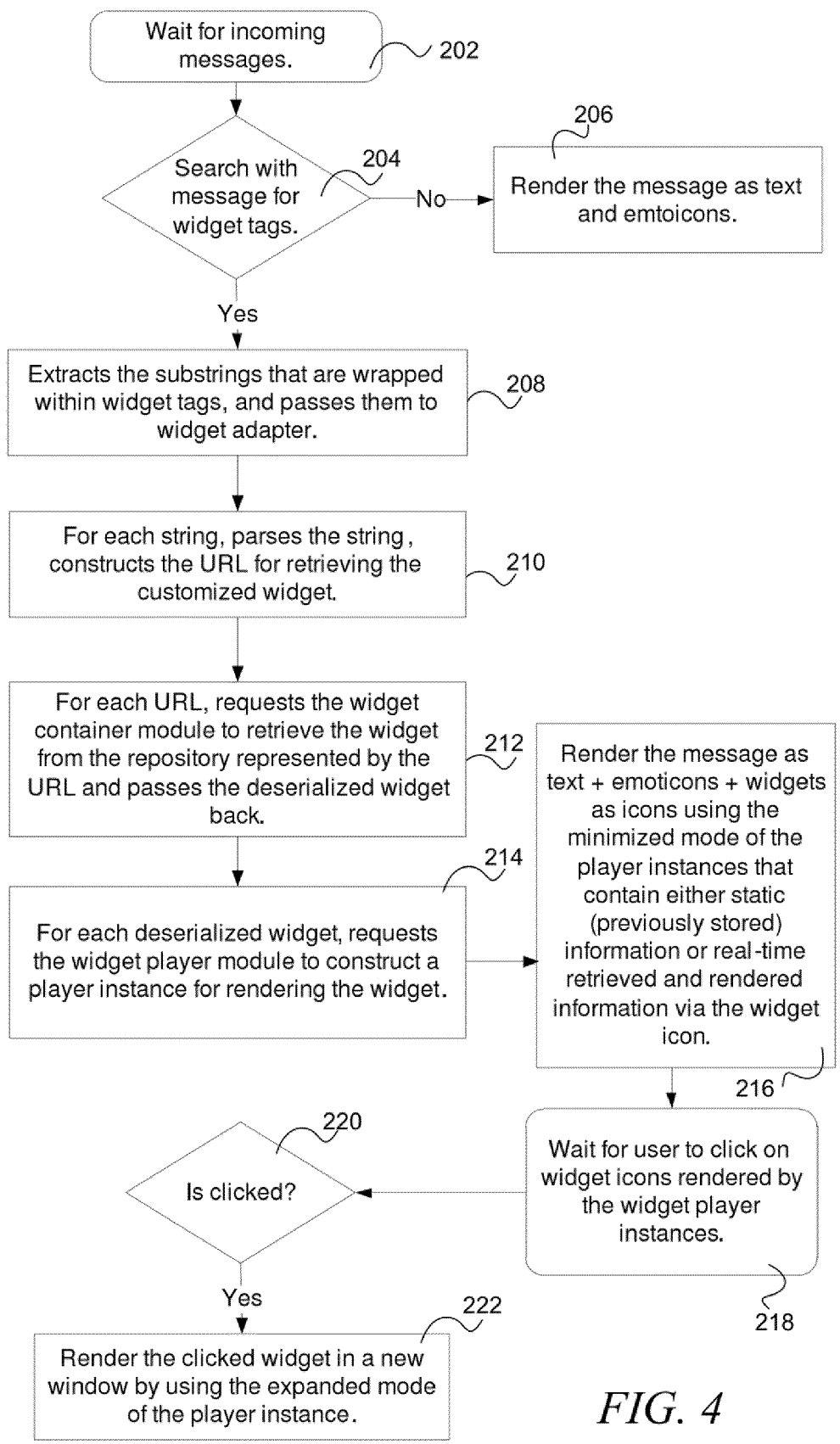
FIG. 4 illustrates the process flow of a sender's message sequence transmitting a message with embedded widget(s) within the instant messaging widget framework.

FIG. 4 illustrates the process flow of a receiver computing system including a receiving widget aware instant messaging application. The widget aware instant message application initially sits idle waiting for incoming messages 202. Upon receiving an incoming message, the application searches the messages for widget tags 204. If no tags are available, the message is determined to be a message having text and emoticons 206. If the message includes widget tags, the substrings that are wrapped within the widget tags are extracted and transmitted to the receiving widget adaptor 208. Next, each string is parsed in order to construct the URL that will be used for retrieving a customized widget 210. For each URL, a request is made to the receiving widget container module to retrieve the widget from the repository represented by the URL and the deserialized widget is sent back to the widget container module 212. For each deserialized widget a request is made to the widget player module to construct a player instance that shall be used to render the widget 214. The widget player module renders the message as text along with emoticons and widgets as icons by using the minimized mode of the player instances that contain either static (previously stored) information or real-time retrieved and rendered information through the graphical representation of the widget icon 216. The application waits for the user to click on the widget icons rendered by the widget player instances 218. Upon clicking the widget icons rendered by the widget player 220, the widget is presented in a new window by using the expanded mode of the player instance 222.

Figure 5:
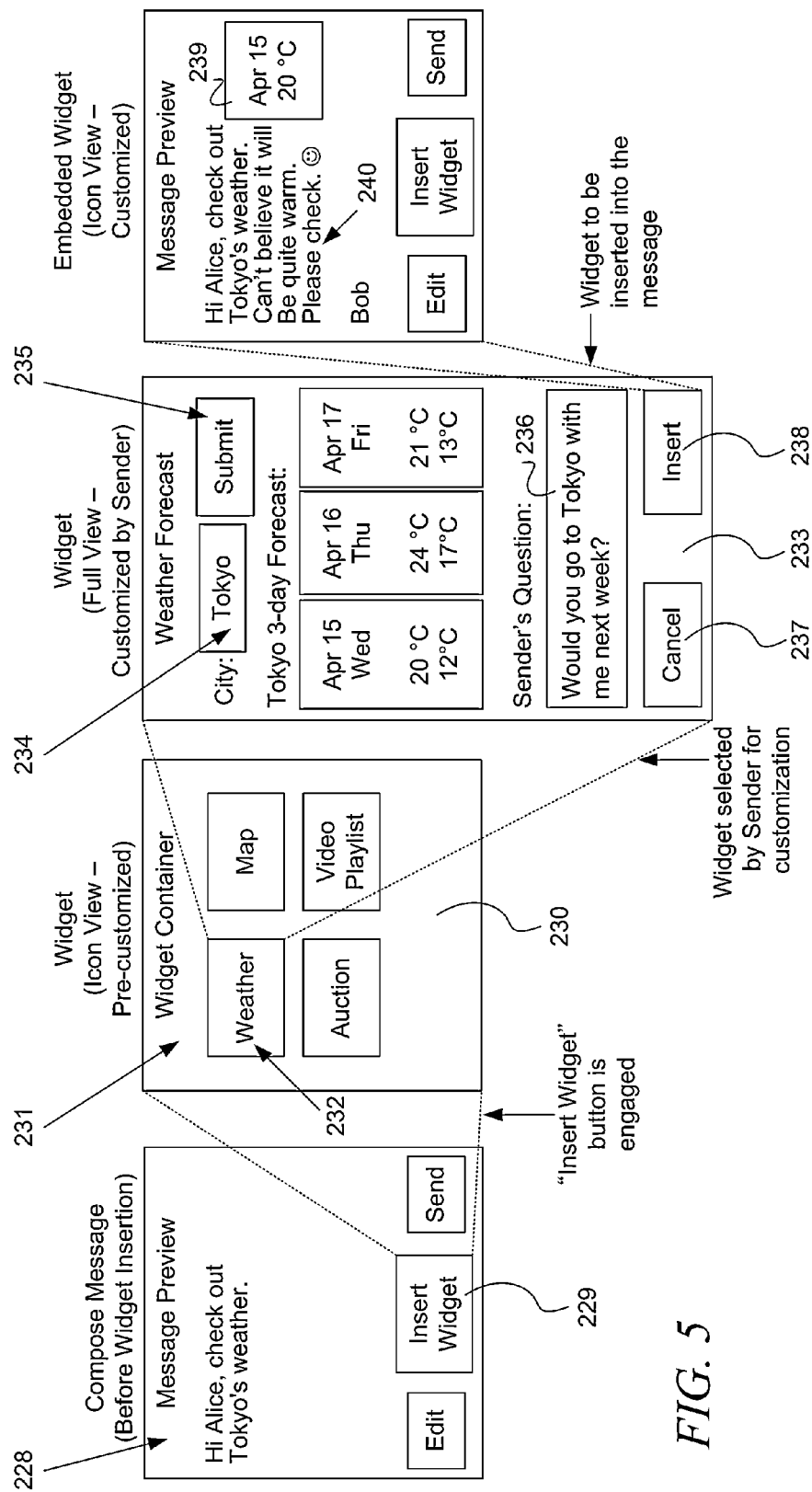
FIG. 5 illustrates the sequence of GUI associated with the process of embedding a widget within an instant message and transmitting a message including text and an embedded widget(s)
Figure 6:
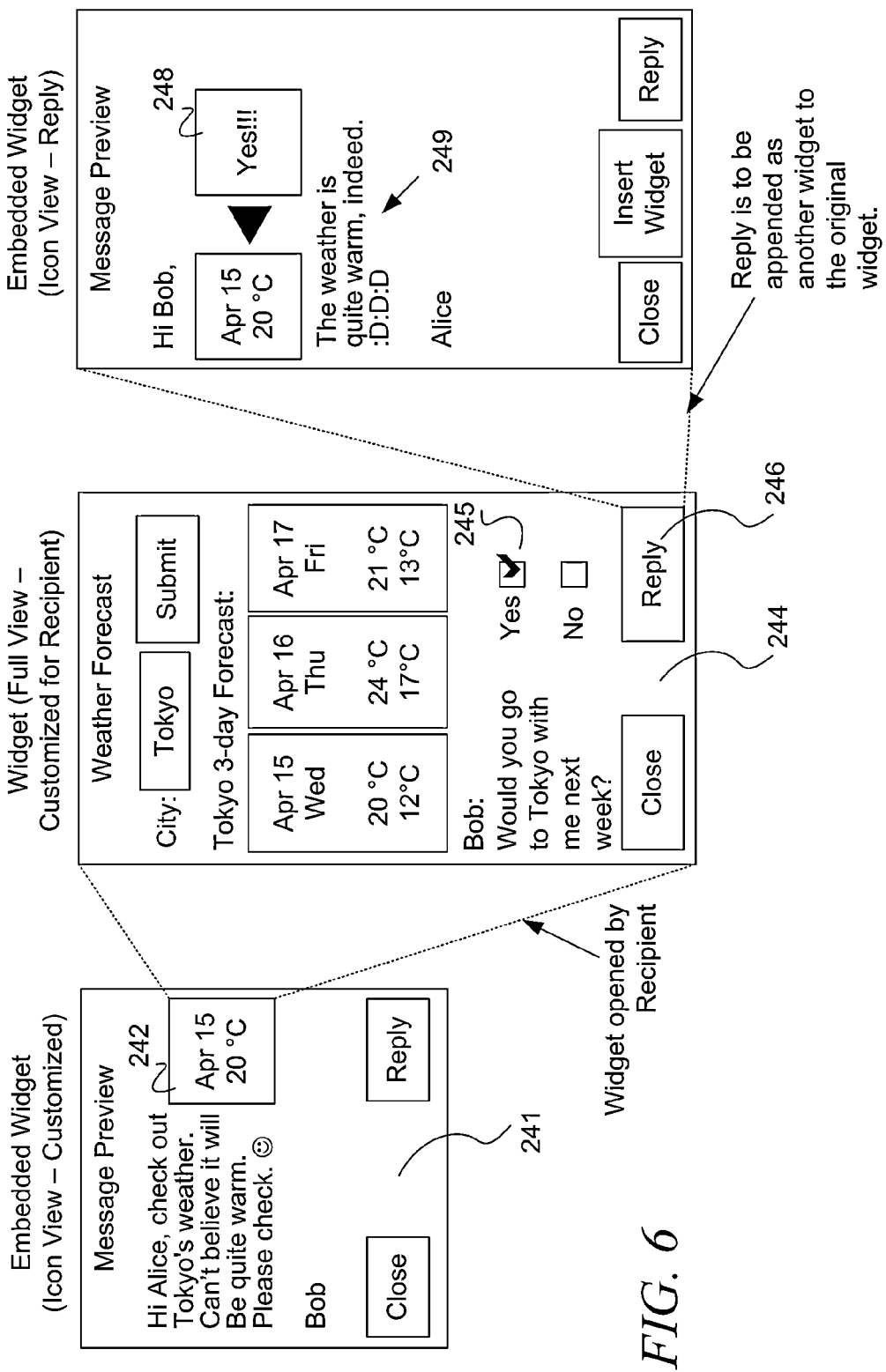
FIG. 6 illustrates the sequence of GUI associated with the process of receiving an instant message that includes an embedded widget with limited real estate and the widget when exploded to illustrate all data within the widget and the GUI associated with a receiver's reply to the message.

FIGS. 5 and 6 describe a sample scenario to illustrate the mechanisms behind the operations of the instant messaging system with widget customization and embedment support. For illustration purpose, consider a simple scenario where two individuals, Bob and Alice are messaging online, discussing a trip to Tokyo that they are about to take in a couple of days. First, Bob wants to let Alice know the current weather condition in Tokyo and he inputs some text in message compose area 228. Bob then wants to insert a weather widget in order to provide the most current information about the weather and to make the message more fun by having an interesting widget icon in the message. By clicking on the "Insert Widget" button 229, Bob is presented with a widget container 230 which includes a plurality of pre-customized widgets 231 within the widget container 230. Following Bob's selection of the weather widget 232, the weather widget 232 is expanded to a full view 233. Bob uses the widget customization manager to customize the weather widget 234 in order to display the weather in Tokyo, first by entering "Tokyo" in the city input field 234 and then engaging the "Submit" button 235. The 4-day forecasts of Tokyo is retrieved by the widget container and displayed in the widget area 233. Bob then inputs a personal "Yes-No" question for Alice 236. Next, the weather widget is embedded into the instant message that he will send Alice through the widget message adapter. The full view of a widget having been customized by the user includes a cancel button 237 and an insert button 238. The cancel button cancels the process in which the original weather widget 232 was exploded into the full view 233. Upon engaging the insert button 238, the widget may be inserted into a message in the manner illustrated by its icon view 239, which contains real-time retrieved info about the weather in Tokyo associated with a specific date. Bob further adds some comments about the upcoming weather condition in Tokyo 240. So, when Bob sends the message, the adapter contacts the widget server to create a unique widget instance with Bob's customized parameters. The message adapter further uploads the widget content to the remote repository so that the content is downloadable by the recipient.

When the instant message arrives at Alice's computer 241, as illustrated in FIG. 6, the message, which includes an embedded widget represented by an icon which shows the average temperature in Tokyo 242 on April 15 is decoded by the Alice's widget adapter. Alice's widget adapter also retrieves the widget content, which allows Alice to enable a full view of the widget 244. Within the full widget display 244, Alice reads about the current weather in Tokyo and she replies to Bob's personal "Yes-No" invitation by checking "Yes" in the checkbox 245 from the embedded widget and may be allowed to instantly reply to Bob regarding his comment about the current cold weather in Tokyo by initiating reply button 246. This function facilitates the appendage of the reply as a widget to the original widget illustrated as an embedded widget icon 248 automatically. Alice may then continue to add additional comments about the weather in Tokyo 249.

What is claimed is:

1. A computing system configured to facilitate enhanced instant messaging, the computing system comprising a processor and a memory, wherein the computing system includes a messaging module and a widget player module that, when executed by the processor, are configured to facilitate:
    creation of text for an instant message;
    selection of at least one widget from a plurality of customizable widgets;
    personalization of the at least one widget selected;
    embedding of the at least one widget within the instant message;
    rendering, by the processor in the computing system, the instant message containing the embedded at least one widget, the at least one widget being minimized and represented as a first icon using a minimized mode of the widget player module, the first icon displaying real-time retrieved and rendered information; and sending, by the processor in the computing system, the instant message to a remote computer, the remote computer comprising a widget adapter that enables a full view of the minimized at least one widget represented as the first icon in the instant message, the full view comprising additional information not shown in the first icon, the additional information comprising a reply request from the remote computer and an option for sending the reply to the computing system, wherein the reply is within a customized widget embedded in a return instant message, wherein the customized widget is represented as a second icon in the return instant message, the return instant message comprising text in response to the instant message, the first icon and the second icon, the second icon displaying the reply.

2. The messaging module of claim 1 wherein the at least one widget is configured to dynamically select and package content from a set of available information that the at least one widget configured to render, based on the viewing context as well as other multi-dimensional criteria including but not limited to the importance, the relevancy, and the recency of the information to be rendered.

3. The messaging module of claim 2 wherein the viewing context includes data representative of at least one of the role of the viewer and current screen estate allocated to the widget.

4. The messaging module of claim 2 wherein the content selected and packaged is rendered by a widget player.

5. The messaging module of claim 1 wherein at least one widget selected from a plurality of customizable widgets is stored in a widget container.

6. The messaging module of claim 1 wherein the messaging module is operatively configured to dynamically allocate screen real estate through which widgets may be rendered so that widgets may have a viewing context to determine the information that should be contained in the widget and how the widget is presented in the instant message.

7. The messaging module of claim 6 wherein the messaging module is operatively configured to assess the role of the viewer so that widgets may have a viewing context to determine the information that should be contained in the widget and how the widget is presented in the instant message.

8. The messaging module of claim 1, wherein the messaging module comprises a widget message adapter module, wherein the widget message adapter module is utilized to facilitate extension of instant message systems to support widgets, wherein the widget message adapter module is responsible for converting the widgets into data for insertion into the instant message, wherein the widget message adapter module is further responsible for converting embedded data back to a widget data format for processing and display by the widget player module, wherein the widget message adapter module is operable on top of different instant messaging networks.

9. The messaging module of claim 8, wherein the widget message adapter module is operatively configured to interact with text-based instant message networks, wherein the widget adapter module is responsible for converting the widgets to and from text strings, wherein the widget message adapter module is operatively configured to process a customized widget for sending to a text-based instant message network and to save the customized widget to a repository for retrieval by a recipient, wherein the widget message adapter module is further operatively configured to create a widget text string containing a retrieval URL, wherein the widget message adapter module is further operatively configured to insert the widget text string into the instant message, wherein the widget text string comprises a unique tag that wraps around the retrieval URL such that a widget-aware instant messaging application knows that a particular substring represents the customized widget, wherein the retrieval URL is created by passing the customized widget from the widget adapter module to a widget container for storing the customized widget to a public remote repository, wherein the retrieval URL is constructed based on a URL of the public remote repository and wherein an identifier of the customized widget is saved within the public remote repository.

* * * * *